United States Patent
Takemura et al.

(10) Patent No.: US 6,504,952 B1
(45) Date of Patent: Jan. 7, 2003

(54) IMAGE PROCESSING METHOD AND APPARATUS

(75) Inventors: Kazuhiko Takemura, Kanagawa-ken (JP); Fumito Takemoto, Kanagawa-ken (JP)

(73) Assignee: Fuji Photo Film Co. Ltd., Kanagawa-ken (JP)

( * ) Notice: Subject to any disclaimer, the term of this patent is extended or adjusted under 35 U.S.C. 154(b) by 0 days.

(21) Appl. No.: 09/271,283

(22) Filed: Mar. 17, 1999

(30) Foreign Application Priority Data

Mar. 17, 1998 (JP) .......................................... 10-066783
Sep. 8, 1998 (JP) .......................................... 10-253818

(51) Int. Cl.$^7$ ................................................ H04N 1/46
(52) U.S. Cl. ...................................... 382/167; 382/162
(58) Field of Search ................................. 382/167, 162; 358/516, 501, 504, 515, 518, 520, 523, 530

(56) References Cited

U.S. PATENT DOCUMENTS

| | | | | |
|---|---|---|---|---|
| 3,553,371 A | * | 1/1971 | Suenaga ...................... | 358/501 |
| 5,420,967 A | * | 5/1995 | Delp ............................ | 345/619 |
| 5,614,925 A | * | 3/1997 | Braudaway et al. ......... | 345/593 |
| 5,870,077 A | * | 2/1999 | Dillinger et al. ............ | 345/600 |
| 5,920,358 A | * | 7/1999 | Takemura .................... | 345/603 |

FOREIGN PATENT DOCUMENTS

| | | | | |
|---|---|---|---|---|
| JP | 01281524 A | * | 11/1989 | ............. G06F/3/12 |
| JP | 1155688 | | 2/1999 | |
| JP | 2000152270 A | * | 5/2000 | ............. H04N/9/64 |

OTHER PUBLICATIONS

Kikuchi et al.; "Auto White–Balance Control System by Using Picture Television"; Technical Report of the Institute of Television Engineers of Japan; Jun. 26, 1990; pp. 19–24.

* cited by examiner

Primary Examiner—Thomas D. Lee
Assistant Examiner—Stephen Brinich
(74) Attorney, Agent, or Firm—Birch, Stewart, Kolasch & Birch, LLP

(57) ABSTRACT

Tristimulus values of each of pixels in an image, which is represented by an image signal, are transformed into chromaticity values, and mean values of the chromaticity values having been calculated with respect to the pixels in the image are calculated. The mean values of the chromaticity values are transformed into physiological primary colors. The thus obtained physiological primary colors are regarded as the white of a photographing illuminant, under which a photographing operation was carried out. The chromaticity values are transformed such that the thus obtained physiological primary colors may coincide with the physiological primary colors of a reference photographing illuminant. The chromaticity values, which have been obtained from the transformation, are then transformed into RGB color signals. The thus obtained RGB color signals are subjected to image processing and then used for reproducing a visible image.

34 Claims, 8 Drawing Sheets

IMAGE PROCESSING METHOD AND APPARATUS

BACKGROUND OF THE INVENTION

1. Field of the Invention

This invention relates to an image processing method and apparatus for transforming colors of an image, which is to be reproduced on, for example, a color print or a color display device. This invention also relates to a recording medium, on which a program for causing a computer to execute the image processing method has been recorded and from which the computer can read the program. This invention further relates to an image sensing system and an image reproducing system.

2. Description of the Related Art

With digital electronic still cameras (hereinbelow referred to as digital cameras), an image having been acquired with a photographing operation can be stored as a digital image signal on a recording medium, such as an internal memory or an IC card provided in the digital camera. The image having been acquired with the photographing operation can then be reproduced from the stored digital image signal as a hard copy, such as a print, or a soft copy on a display device. In cases where the image having been acquired with the digital camera is to be reproduced, it is desired that an image having image quality as good as the image quality of a photograph printed from negative film can be obtained.

Photographing operations with digital cameras are carried out under various photographing illuminants, such as tungsten light, fluorescent lamps, and outdoor daylight. Therefore, a digital camera, which has functions for automatically setting white balance in accordance with a photographing illuminant with respect to the image having been recorded with a photographing operation, has been proposed. Also, a technique, which utilizes characteristics such that a primary object pattern may be embedded at a center position in an image, and in which white balance is determined by dividing an image into subdivisions and assigning a large weight factor to a subdivision at the center position in the image, has been proposed ("Automatic White Balance Adjusting System Using Image Division" by Kikuchi, et al., Technical Report of The Institute of Television Engineers of Japan, pp. 19–24, Jun. 26, 1990).

In cases where automatic correction is carried out by a digital camera in the manner described above, with respect to an image having been acquired under, for example, tungsten light, an adjustment is made such that the balance of RGB tristimulus values with respect to the tungsten light may become identical. The human visual system has functions referred to as chromatic adaptation such that, in both cases where white paper is seen under daylight and when the same white paper is seen under a fluorescent lamp having a spectral energy distribution different from the spectral energy distribution of the daylight, the color of the white paper can basically be recognized as white. However, in cases where the white paper is seen under tungsten light, the color of the white paper is often perceived as white with a yellow tint. Such phenomenon occurs since chromatic adaptation is not carried out completely. The phenomenon is referred to as incomplete chromatic adaptation. The incomplete chromatic adaptation is apt to occur when the tint of the viewing illuminant is strong or when the luminance of the viewing illuminant is low. Therefore, it is desired that colors of an image can be transformed by considering the chromatic adaptation and the incomplete chromatic adaptation of the human visual system, such that the reproduced image may have the same color appearances as the color appearances of the image, which was recorded with a photographing operation.

Therefore, an image processing method has been proposed wherein, after information representing photographing conditions with a digital camera, such as a photographing illuminant and brightness under which a photographing operation was carried out, has been recorded on a recording medium together with an image signal, the information representing the photographing conditions is fetched from the recording medium together with the image signal, image processing appropriate for the photographing conditions is carried out on the image signal, and an image true to the original scene is reproduced as a hard copy or a soft copy from the thus obtained processed image signal. Such an image processing method is proposed in, for example, Japanese Patent Application No. 9(1997)-207883.

However, the image processing method proposed in Japanese Patent Application No. 9(1997)-207883 is based upon the assumption that a digital camera is provided with the functions for recording the information representing the photographing conditions on the recording medium. Therefore, the proposed image processing method is not efficient for ordinary digital cameras.

With the aforesaid technique for automatically setting the white balance, it is necessary for a camera to be provided with means for automatically setting the white balance, and therefore the cost of the camera cannot be kept low. Ordinarily, cheap digital cameras are not provided with such means. With digital cameras which are not provided with the functions for automatically setting the white balance, in order for a reproduced image having good image quality to be obtained, it is necessary that an image is temporarily reproduced and displayed on a display device, and that an operator carries out an operation for adjusting the color balance and the white balance by seeing the displayed image. However, a great deal of skill is required to carry out such adjustment, and ordinary users cannot easily obtain satisfactory reproduced images by adjusting the white balance, and the like.

SUMMARY OF THE INVENTION

The primary object of the present invention is to provide an image processing method, wherein an image is capable of being transformed with a simple constitution and an easy operation such that a reproduced image giving an impression of the same appearances as the appearances of an original scene, which has been photographed, may be obtained.

Another object of the present invention is to provide an apparatus for carrying out the image processing method.

A further object of the present invention is to provide a recording medium, on which a program for causing a computer to execute the image processing method has been recorded and from which the computer can read the program.

A still further object of the present invention is to provide an image sensing system.

Another object of the present invention is to provide an image reproducing system.

The present invention provides a first image processing method, comprising the steps of:

i) calculating physiological primary colors of each of pixels in an image, which is represented by an image signal having been acquired with an image sensing operation, and ii) carrying out image processing on the image signal and in accordance with the physiological primary colors having been calculated, a processed image signal being thereby obtained.

The term "acquiring with an image sensing operation" as used herein means that an object is photographed with a digital camera and an image signal representing the object image is thereby obtained, or that an object image, which has been recorded on negative film, reversal film, or the like, with a photographing operation, is read out from the film by using an image read-out apparatus, such as a scanner, and an image signal representing the object image is thereby obtained.

The present invention also provides a second image processing method, comprising the steps of:

i) transforming R, G, and B colors of each of pixels in an image, which is represented by an image signal having been acquired with an image sensing operation, into chromaticity values, ii) calculating chromaticity mean values, which are mean values of the chromaticity values having been obtained with respect to the pixels in the image, iii) transforming the chromaticity mean values into tristimulus values in accordance with physiological primary colors, and iv) regarding the tristimulus values in accordance with physiological primary colors as the white of a photographing illuminant, under which the image signal was acquired, and transforming the image signal such that the tristimulus values may coincide with chromaticity values of a white point of a reference photographing illuminant, a processed image signal being thereby obtained.

The term "physiological primary colors" as used herein means the primary colors, which a person perceives with the visual cells of the eyes when he sees an object. It is considered that the phenomenon of white paper looking in white under various different illuminants is achieved by adjusting red, green, and blue response quantities (i.e., the tristimulus values), which are represented in accordance with physiological primary colors, under each of the various different illuminants.

The term "reference photographing illuminant" as used herein means the photographing illuminant, which is different from the photographing illuminant used when an image signal is acquired, and which is to be used for reference when an image signal is to be acquired. Specifically, as for ordinary cameras, D50~D60 daylight is employed as the reference photographing illuminant.

The second image processing method in accordance with the present invention should preferably be modified such that, as the differences between the tristimulus values in accordance with physiological primary colors and the chromaticity values of the white point of the reference photographing illuminant become large, the degree of the coincidence may be kept to be low.

The present invention further provides a third image processing method, comprising the steps of:

i) transforming R, G, and B colors of each of pixels in an image, which is represented by an image signal having been acquired with an image sensing operation, into chromaticity values, ii) calculating chromaticity mean values, which are mean values of the chromaticity values having been obtained with respect to the pixels in the image, iii) transforming the chromaticity mean values into RGB tristimulus values, and iv) regarding the RGB tristimulus values as the white of a photographing illuminant, under which the image signal was acquired, and transforming the image signal such that the RGB tristimulus values may coincide with chromaticity values of a white point of a reference photographing illuminant, a processed image signal being thereby obtained.

The third image processing method in accordance with the present invention should preferably be modified such that, as the differences between the RGB tristimulus values and the chromaticity values of the white point of the reference photographing illuminant become large, the degree of the coincidence may be kept to be low.

In the second and third image processing methods in accordance with the present invention, the chromaticity mean values should preferably be calculated as weighted mean values in accordance with a reciprocal of a distance of the chromaticity values from a CIE daylight locus or a black body locus.

The term "CIE daylight locus" as used herein means the locus representing the daylight color on the CIE chromaticity diagram. The term "black body locus" as used herein means is the locus representing the relationship between the absolute temperature of a black body and the chromaticity at the absolute temperature. The CIE daylight locus and the black body locus are the ones utilized ordinarily.

The term "weighting in accordance with a reciprocal of a distance" as used herein means that, as the distance between the chromaticity values of a pixel and the daylight locus or the black body locus becomes large, the degree of weighting is set to be low.

Also, in the second and third image processing methods in accordance with the present invention, the white point of the reference photographing illuminant should preferably be set in accordance with the white point of the photographing illuminant such that the white point of the reference photographing illuminant may have values falling within a predetermined range.

The term "setting such that a white point may have values falling within a predetermined range" as used herein means that, instead of being set as only one point, the white point of the reference photographing illuminant is set so as to have values falling within a certain range.

In the first, second, and third image processing methods in accordance with the present invention, the processed image signal should preferably be transformed even further in accordance with reproduction target values of a reproducing apparatus, which reproduces a visible image from the processed image signal.

The present invention still further provides a first image processing apparatus, comprising:

i) a physiological primary color calculating means for calculating physiological primary colors of each of pixels in an image, which is represented by an image signal having been acquired with an image sensing operation, and ii) an image processing means for carrying out image processing on the image signal and in accordance with the physiological primary colors having been calculated, a processed image signal being thereby obtained.

The present invention also provides a second image processing apparatus, comprising:

i) a chromaticity value transformation means for transforming R, G, and B colors of each of pixels in an image, which is represented by an image signal having been acquired with an image sensing operation, into chromaticity values, ii) a chromaticity mean value calculating means for calculating chromaticity mean values, which are mean values of the chromaticity values having been obtained with respect to the pixels in the image, iii) a tristimulus value transformation means for transforming the chromaticity mean values into tristimulus values in accordance with physiological primary colors, and iv) a chromatic adaptation transformation means for regarding the tristimulus values in accordance with physiological primary colors as the white of a photographing illuminant, under which the image signal was acquired, and transforming the image signal such that the tristimulus values may coincide with chromaticity values of a white point of a reference photographing illuminant, a processed image signal being thereby obtained.

In the second image processing apparatus in accordance with the present invention, the chromatic adaptation transformation means should preferably operate such that, as the differences between the tristimulus values in accordance with physiological primary colors and the chromaticity values of the white point of the reference photographing illuminant become large, the degree of the coincidence may be kept to be low.

The present invention further provides a third image processing apparatus, comprising:

i) a chromaticity value transformation means for transforming R, G, and B colors of each of pixels in an image, which is represented by an image signal having been acquired with an image sensing operation, into chromaticity values, ii) a chromaticity mean value calculating means for calculating chromaticity mean values, which are mean values of the chromaticity values having been obtained with respect to the pixels in the image, iii) a tristimulus value transformation means for transforming the chromaticity mean values into RGB tristimulus values, and iv) a chromatic adaptation transformation means for regarding the RGB tristimulus values as the white of a photographing illuminant, under which the image signal was acquired, and transforming the image signal such that the RGB tristimulus values may coincide with chromaticity values of a white point of a reference photographing illuminant, a processed image signal being thereby obtained.

In the third image processing apparatus in accordance with the present invention, the chromatic adaptation transformation means should preferably operate such that, as the differences between the RGB tristimulus values and the chromaticity values of the white point of the reference photographing illuminant become large, the degree of the coincidence may be kept to be low.

In the second and third image processing apparatuses in accordance with the present invention, the chromaticity mean value calculating means should preferably calculate the chromaticity mean values as weighted mean values in accordance with a reciprocal of a distance of the chromaticity values from a CIE daylight locus or a black body locus.

Also, the second and third image processing apparatuses in accordance with the present invention should preferably further comprise means for setting the white point of the reference photographing illuminant in accordance with the white point of the photographing illuminant such that the white point of the reference photographing illuminant may have values falling within a predetermined range.

The first, second, and third image processing apparatuses in accordance with the present invention should preferably further comprise an output transformation means for transforming the processed image signal in accordance with reproduction target values of a reproducing apparatus, which reproduces a visible image from the processed image signal.

Each of the first, second, and third image processing methods in accordance with the present invention may be furnished as a program for causing a computer to execute the image processing method and having been recorded on a recording medium, from which the computer can read the program.

The present invention still further provides an image sensing system, comprising:

i) an image sensing means for detecting an object image with an image sensing operation and thereby obtaining an image signal, which represents the object image, ii) an image processing apparatus in accordance with the present invention, which carries out image processing on the image signal and thereby obtains a processed image signal, and iii) a recording means for recording the processed image signal, which has been obtained from the image processing carried out by the image processing apparatus, on a recording medium.

The present invention also provides an image reproducing system for reproducing a visible image from an image signal, comprising:

i) an input means for receiving the image signal, ii) an image processing apparatus in accordance with the present invention, which carries out image processing on the image signal having been received from the input means and thereby obtains a processed image signal, and iii) a reproducing means for reproducing the visible image from the processed image signal, which has been obtained from the image processing carried out by the image processing apparatus.

With the first image processing method and apparatus in accordance with the present invention, the image processing is carried out on the image signal and in accordance with the physiological primary colors of each of the pixels in an image, which is represented by the image signal. Therefore, the image signal is processed in accordance with the colors, which are recognized by a person when he sees the object. Accordingly, the image processing can be carried out on the image signal, such that an image true to an impression, which a person received when he saw the object image, may be reproduced. From the processed image signal having been obtained from the image processing, an image true to the impression, which a person received when he saw the object image, can be reproduced.

With the second image processing method and apparatus in accordance with the present invention, the R, G, and B colors of each of the pixels in an image are transformed into the chromaticity values, and the chromaticity mean values, which are the mean values of the chromaticity values having been obtained with respect to the pixels in the image, are calculated. The chromaticity mean values are then transformed into the tristimulus values in accordance with physiological primary colors. In the second image processing method and apparatus in accordance with the present invention, the tristimulus values in accordance with physiological primary colors, which tristimulus values have been calculated from the image signal, are regarded as the white which a person perceives when he sees the object at the site, i.e., the white of the photographing illuminant, under which the image signal was acquired. The image signal is transformed such that the tristimulus values in accordance with physiological primary colors may coincide with the chromaticity values of the white point of the reference photographing illuminant. The appearances of an image vary for different photographing illuminants, under which the image signal is acquired. For example, in cases where an image is photographed in a cloudy day or in the shade, the white in the image looks in white with a blue tint as a whole. However, by virtue of the chromatic adaptation, a person recognizes the white with a blue tint as the white. Therefore, with the second image processing method and apparatus in accordance with the present invention, wherein the image signal is transformed such that the tristimulus values in accordance with physiological primary colors may coincide with the chromaticity values of the white point of the reference photographing illuminant, the white represented by the image signal is transformed into the same white as the white, which is represented by an image signal acquired under the reference photographing illuminant. As a result, an image true to the impression of the image appearances at the time of the acquisition of the image signal can be reproduced.

The second image processing method and apparatus in accordance with the present invention may be modified such that, as the differences between the tristimulus values in accordance with physiological primary colors and the chromaticity values of the white point of the reference photographing illuminant become large (as in cases where white paper is seen under tungsten light), the degree of the coincidence between the tristimulus values and the chromaticity values of the white point of the reference photographing illuminant may be kept to be low. In such cases, the image signal can be transformed such that the feeling given under the photographing illuminant at the time of the photographing operation may remain. In this manner, an image true to the appearances of the original scene can be reproduced.

With the third image processing method and apparatus in accordance with the present invention, the R, G, and B colors of each of the pixels in an image are transformed into the chromaticity values, and the chromaticity mean values, which are the mean values of the chromaticity values having been obtained with respect to the pixels in the image, are calculated. The chromaticity mean values are then transformed into the RGB tristimulus values. Also, as in the second image processing method and apparatus in accordance with the present invention, the RGB tristimulus values are regarded as the white of the photographing illuminant, under which the image signal was acquired, and the image signal is transformed such that the RGB tristimulus values may coincide with the chromaticity values of the white point of the reference photographing illuminant. Therefore, the white represented by the image signal is transformed into the same white as the white, which is represented by an image signal acquired under the reference photographing illuminant. As a result, an image true to the impression of the image appearances at the time of the acquisition of the image signal can be reproduced. Also, in the aforesaid second image processing method and apparatus in accordance with the present invention, wherein the chromatic adaptation transformation is carried out in accordance with the tristimulus values in accordance with physiological primary colors, it is necessary for the image signal to be transformed into the physiological primary colors at the time of the chromatic adaptation transformation. However, with the third image processing method and apparatus in accordance with the present invention, wherein the chromatic adaptation transformation is carried out in accordance with the RGB tristimulus values, it is not necessary for the image signal to be transformed into the physiological primary colors at the time of the chromatic adaptation transformation. Accordingly, with the third image processing method and apparatus in accordance with the present invention, the time required to carry out the operations can be kept short, and the constitution of the image processing apparatus can be kept simple.

Further, the third image processing method and apparatus in accordance with the present invention may be modified such that, as the differences between the RGB tristimulus values and the chromaticity values of the white point of the reference photographing illuminant become large (as in cases where white paper is seen under tungsten light), the degree of the coincidence between the RGB tristimulus values and the chromaticity values of the white point of the reference photographing illuminant may be kept to be low. In such cases, the image signal can be transformed such that the feeling given under the photographing illuminant at the time of the photographing operation may remain. In this manner, an image true to the appearances of the original scene can be reproduced.

On the chromaticity diagram, chromaticity values, which are located at a position remote from the CIE daylight locus or the black body locus, may be regarded as not being the color of the illuminant and as being an object color, such as the color of red clothes or the blue sky. Therefore, in cases where the chromaticity mean values are calculated as the weighted mean values in accordance with the reciprocal of the distance of the chromaticity values from the CIE daylight locus or the black body locus, the tristimulus values in accordance with physiological primary colors or the RGB tristimulus values can be obtained such that they may more accurately represent the white of the photographing illuminant. Accordingly, in cases where the tristimulus values are calculated from the thus obtained chromaticity mean values, more accurate image processing can be carried out.

In cases where the white point of the reference photographing illuminant is set in accordance with the white point of the photographing illuminant such that the white point of the reference photographing illuminant may have values falling within a predetermined range, processing can be carried out such that the color of the photographing illuminant, under which the image signal was acquired, may be reflected. Also, since the white point of the reference photographing illuminant has values falling within the predetermined range, an appropriate white point falling within the predetermined range and the tristimulus values in accordance with physiological primary colors or the RGB tristimulus values can be made to coincide with each other. In this manner, the advantages over the cases where the tristimulus values are made to coincide with only one white point can be obtained in that excessive chromatic adaptation transformation can be prevented from being carried out. As a result, a processed image signal, from which an image having a more natural feeling can be reproduced, can be obtained.

Further, the processed image signal has been corrected such that the white point represented by the processed image signal may coincide with the white point obtained under the reference photographing illuminant. Therefore, in cases where the processed image signal is transformed even further in accordance with the reproduction target values of the reproducing apparatus, the processed image signal can be transformed such that appropriate reproduction target values may be achieved. Accordingly, a reproduced image having good image quality can be obtained from the processed image signal having thus been transformed.

With the image sensing system in accordance with the present invention, which is provided with the image processing apparatus in accordance with the present invention, the image signal having been acquired with the image sensing operation, is recorded on the recording medium as the processed image signal, from which the impression of the appearances at the time of the image sensing operation can be reproduced. Therefore, an image signal, from which the image true to the impression of the appearances at the time of the image sensing operation can be reproduced, can be obtained by merely carrying out the image sensing operation on the object.

With the image reproducing system in accordance with the present invention, which is provided with the image processing apparatus in accordance with the present invention, the inputted image signal is subjected to the image processing such that the impression of the appearances at the time of the photographing operation can be reproduced. The thus obtained processed image signal is then used to reproduce a visible image. Therefore, an image true to the impression of the appearances at the time of the photographing operation can be reproduced by merely inputting the image signal.

DESCRIPTION OF THE PREFERRED EMBODIMENTS

The present invention will hereinbelow be described in further detail with reference to the accompanying drawings.

Figure 1:
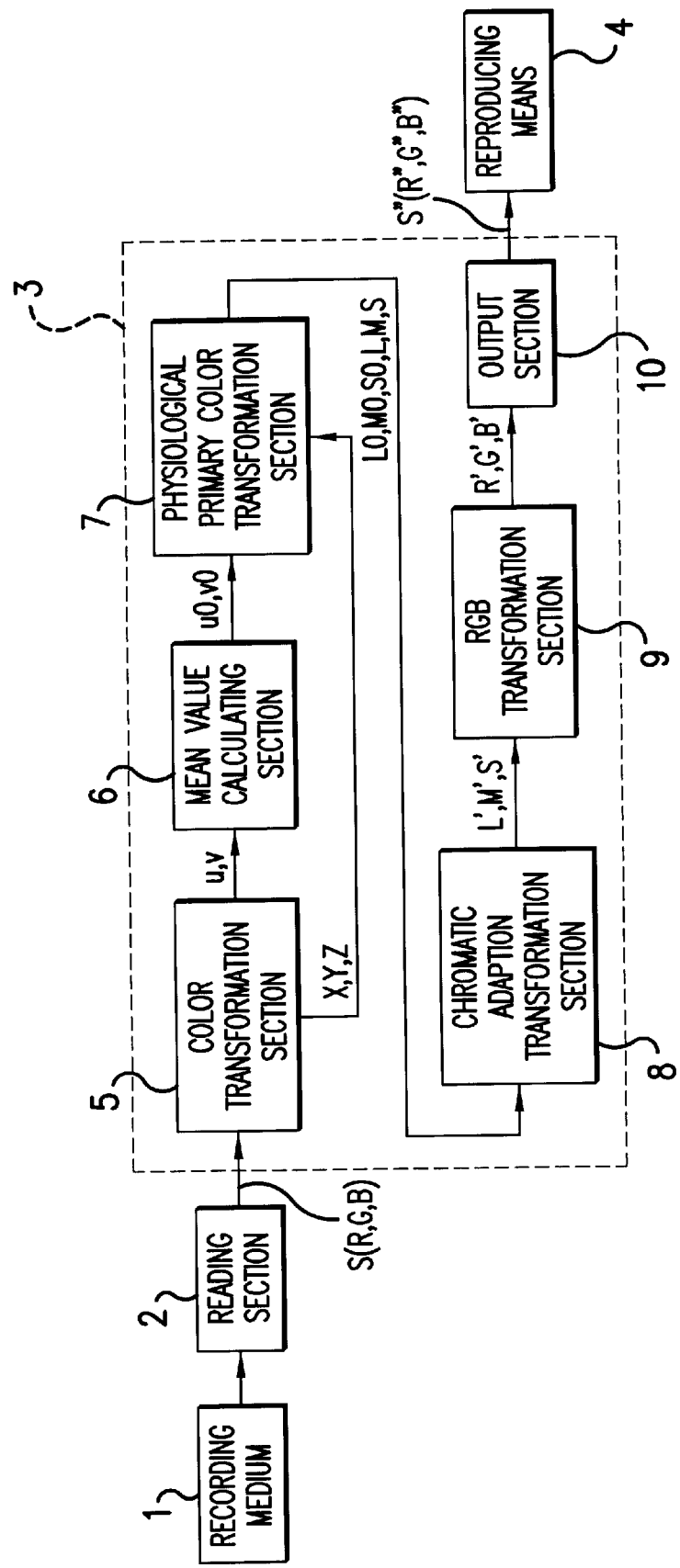
FIG. 1 is a block diagram showing an image processing system, in which a first embodiment of the image processing apparatus in accordance with the present invention is employed.

FIG. 1 is a block diagram showing an image processing system, in which a first embodiment of the image processing apparatus in accordance with the present invention is employed. With reference to FIG. 1, the image processing system, in which the first embodiment of the image processing apparatus in accordance with the present invention is employed, comprises a reading section 2 for reading an image signal S from a recording medium 1, which may be constituted of an optical disk, or the like, and which stores the image signal S. The image signal S has been acquired with a digital camera or by reading out an image, which has been recorded on negative film or reversal film, by using an image read-out apparatus, such as a scanner. The image processing system also comprises an image processing means 3 for carrying out image processing, which will be described later, on the image signal S having been received from the reading section 2. The image processing system further comprises a reproducing means 4 for reproducing a visible image from a processed image signal S", which has been obtained from the image processing carried out by the image processing means 3. The visible image may be reproduced as a hard copy, such as a print, or as a soft copy on a cathode ray tube (CRT) monitor, or the like.

The image signal S, which has been stored in a memory of the digital camera, is duplicated and stored on the recording medium 1 via a card reader or a cable. In cases where the image signal S is obtained with the image read-out apparatus, the image signal S is stored on the recording medium 1 in a signal storing means, which is located in the image read-out apparatus.

The image processing means 3 comprises a color transformation section 5 for transforming tristimulus values R, G, and B of each of pixels in an image, which is reproduced from the image signal S, into tristimulus values X, Y, and Z and chromaticity values u and v. The image processing means 3 also comprises a mean value calculating section 6 for calculating mean values u0 and v0 of the chromaticity values u and v having been calculated with respect to the pixels in the image by the color transformation section 5. The image processing means 3 further comprises a physiological primary color transformation section 7 for transforming the mean values u0 and v0, which have been calculated by the mean value calculating section 6, into physiological primary colors L0, M0, and S0 and transforming the tristimulus values X, Y, and Z, which have been calculated by the color transformation section 5, into physiological primary colors L, M, and S. The image processing means 3 still further comprises a chromatic adaptation transformation section 8 for carrying out chromatic adaptation transformation on the physiological primary colors L, M, and S and in accordance with the physiological primary colors L0, M0, and S0, which have been calculated by the physiological primary color transformation section 7. The image processing means 3 also comprises an RGB transformation section 9 for transforming physiological primary colors L', M', and S', which have been obtained from the chromatic adaptation transformation section 8, into tristimulus values R', G', and B'. The image processing means 3 further comprises an output section 10 for carrying out image processing, such as gradation transformation, on the tristimulus values R', G', and B', which have been calculated by the RGB transformation section 9.

How the first embodiment of the image processing apparatus in accordance with the present invention operates will be described hereinbelow.

Figure 2:
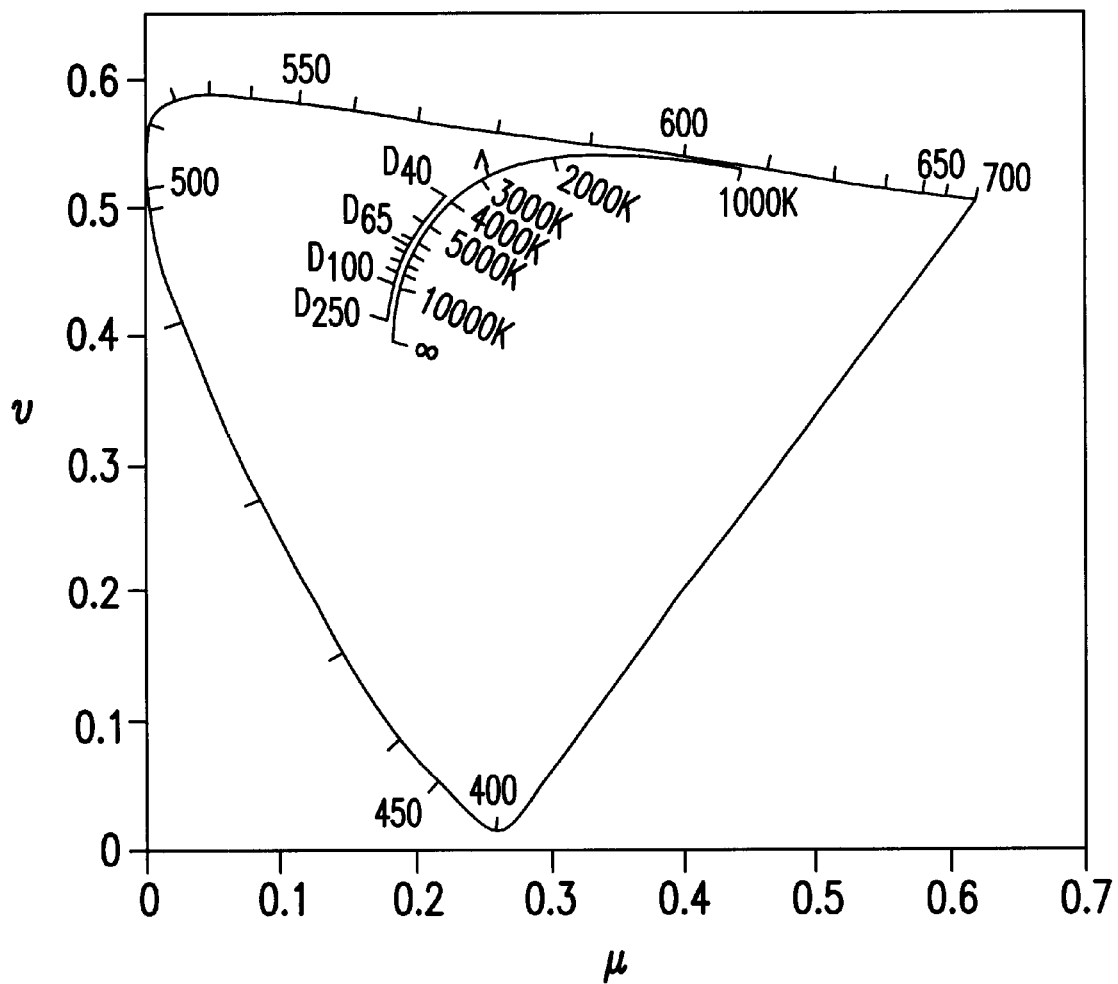
FIG. 2 is a graph showing a chromaticity diagram.

Firstly, the reading section 2 reads the image signal S from the recording medium 1 and feeds it into the image processing means 3. In the image processing means 3, the color transformation section 5 transforms the tristimulus values R, G, and B of each of the pixels in the image, which is reproduced from the image signal S, into the CIE 1931 XYZ tristimulus values and the CIE 1976 uv chromaticity values. The transformation is carried out with Formulas (1) and (2) shown below. The chromaticity values are the values of u and v, which are among the three attributes of color, i.e. the hue, the saturation, and the lightness. Specifically, the chromaticity values are the values of u and v in a diagram shown in FIG. 2, which represents the hue and the saturation, i.e., the values projected in the direction of the lightness. In the strict sense, in the CIE 1976 chromaticity diagram, the chromaticity values are represented by u' and v'. However, in this specification, as an aid in facilitating the explanation, the chromaticity values are represented by u and v.

$$\begin{pmatrix} X \\ Y \\ Z \end{pmatrix} = |A| \cdot \begin{pmatrix} R \\ G \\ B \end{pmatrix} \quad (1)$$

$$u = 4X/(X+15Y+3Z)$$
$$v = 9Y/(X+15Y+3Z) \quad (2)$$

In Formula (1), the matrix $|A|$ is the matrix for transforming the tristimulus values R, G, and B into the tristimulus values X, Y, and Z. By way of example, the values shown in Formula (3) below may be employed for the matrix $|A|$.

$$|A| = \begin{pmatrix} 0.4124 & 0.3576 & 0.1805 \\ 0.2126 & 0.7152 & 0.0722 \\ 0.0193 & 0.1192 & 0.9505 \end{pmatrix} \quad (3)$$

Instead of the matrix $|A|$ being used, the tristimulus values X, Y, and Z may be calculated by using a look-up table.

Signals r, g, and b, which are obtained from the digital camera, are represented in a format in accordance with ITU-R BT. 709 (REC. 709). By way of example, the signal r is encoded with the raising to the 0.45'th power as in Formula (4) shown below.

$$r = 255 \times 4.500R \quad (0 \leq R < 0.018) \quad (4)$$
$$r = 255 \times (1.099R^{0.45} - 0.099) \quad (0.018 \leq R \leq 1)$$

In Formula (4), R represents one of the tristimulus values detected with the camera and is a normalized signal ($0 \leq R \leq 1$). In the same manner, G and B are encoded into g and b. In such cases, the color transformation should preferably be carried out after solving Formula (4) for R and carrying out transformation into normalized tristimulus values R, G, and B.

In the mean value calculating section 6, the mean values u0 and v0 of the chromaticity values u and v, which have been calculated with Formula (2) shown above with respect to the pixels in the image, are calculated with Formula (5) shown below.

$$u0 = \Sigma u/n$$
$$v0 = \Sigma v/n \quad (5)$$

in which n represents the number of the pixels.

In the physiological primary color transformation section 7, the mean values u0 and v0, which have been calculated by the mean value calculating section 6, are transformed into the physiological primary colors L0, M0, and S0 with Formulas (6), (7), and (8) shown below.

$$sx = 9.0 \times u0(6.0 \times u0 - 16.0 \times v0 + 12.0)$$
$$sy = 4.0 \times v0(6.0 \times u0 - 16.0 \times v0 + 12.0) \quad (6)$$

$$X0 = sx/sy$$
$$Y0 = 100.0$$
$$Z0 = (1.0 - sx - sy)/sy \quad (7)$$

$$\begin{pmatrix} L0 \\ M0 \\ S0 \end{pmatrix} = |B| \cdot \begin{pmatrix} X0 \\ Y0 \\ Z0 \end{pmatrix} \quad (8)$$

In Formula (8), the matrix $|B|$ is the matrix for transforming the tristimulus values X0, Y0, and Z0 into the physiological primary colors L0, M0, and S0. By way of example, the values shown in Formula (9) below may be employed for the matrix $|B|$.

$$|B| = \begin{pmatrix} 0.3897 & 0.6890 & -0.0787 \\ -0.2298 & 1.1834 & 0.0464 \\ 0 & 0 & 1.0 \end{pmatrix} \quad (9)$$

Also, in the physiological primary color transformation section 7, the tristimulus values X, Y, and Z, which have been calculated with Formula (1) shown above with respect to each of the pixels in the image, are transformed into the physiological primary colors L, M, and S. The transformation is carried out in accordance with Formula (8) shown above.

In the chromatic adaptation transformation section 8, the physiological primary colors L, M, and S are subjected to the chromatic adaptation transformation, which is carried out with Formulas (10) and (11) shown below. In this manner, the transformed physiological primary colors L', M', and S' are obtained.

$$\begin{pmatrix} L' \\ M' \\ S' \end{pmatrix} = |C| \cdot \begin{pmatrix} L \\ M \\ S \end{pmatrix} \quad (10)$$

in which $$|C| = \begin{pmatrix} (a \cdot Ln + (1-a) \cdot L0)/L0 \\ (a \cdot Mn + (1-a) \cdot M0)/M0 \\ (a \cdot Sn + (1-a) \cdot S0)/S0 \end{pmatrix} \quad (11)$$

In Formula (11), L0, M0, and S0 represent the physiological primary colors of the mean values of the chromaticity values and have been calculated with Formula (8) shown above. The physiological primary colors L0, M0, and S0 may be regarded as the white of a photographing illuminant, under which the image signal S was acquired. In cases where the image signal S is the one having been obtained by reading out an image recorded on film, or the like, the white is the combination of the white of the photographing illuminant and the white of the illuminant of the scanner. Also, Ln, Mn, and Sn represent the chromaticity of the white of a reference photographing illuminant, which serves as reference at the time of acquisition of the image signal S. In cases where the values of Ln, Mn, and Sn are unknown, the chromaticity (un, vn) of the white point corresponding to D50~D60 daylight may be employed. In Formula (11), "a" represents the value representing the state of adaptation and is normally 1.

In cases where the original scene is seen under tungsten light or a scene in the evening is seen, it is often preferable that, instead of the tint of the illuminant being corrected completely, the image is reproduced with the tint of the illuminant remaining in the image. In such cases, the value of "a" should preferably be adjusted such that it may fall within the range of 0 to 1. For example, instead of the value of "a" being fixed at 1, the value of "a" should preferably be adjusted by considering the distance between (u0, v0) and (un, vn) on the chromaticity diagram shown in FIG. 2. Specifically, as the distance between (u0, v0) and (un, vn) becomes large, the value of "a" should preferably be adjusted to be small in accordance with Formulas (12) and (13) shown below, such that the tint of the photographing illuminant may remain.

$$dist=\sqrt{((u0-un)^2+(v0-vn)^2)} \quad (12)$$

$$a=1.0-k \times dist \quad (13)$$

in which k represents the fixed number for setting the value of "a" at a value falling within the range of 0 to 1.

Alternatively, the value of "a" may be altered in accordance with the values of (u0, v0). For example, in cases where color correction is to be carried out completely as in the cases other than the tungsten light and the scene in the evening, the value of "a" having been calculated with Formulas (12) and (13) shown above may be employed when the value of u0 is equal to or larger than a predetermined threshold value (e.g., 0.2153), and the value of "a" may be set at 1 when the value of u0 is smaller than the predetermined threshold value. In this manner, an appropriate reproduced image can be obtained.

In the RGB transformation section 9, the transformed physiological primary colors L', M', and S' are transformed into the processed tristimulus values R', G', and B' in accordance with Formula (14) shown below.

$$\begin{matrix} R' \\ G' \\ B' \end{matrix} = |A|^{-1}|B|^{-1} \cdot \begin{matrix} L' \\ M' \\ S' \end{matrix} \quad (14)$$

In the output section 10, the processed tristimulus values R', G', and B' are transformed into tristimulus values R", G", and B", which depend upon the reproducing means 4, by use of a matrix or a look-up table. At this time, gradation processing may be carried out on the processed tristimulus values R', G', and B'. Also, processing for altering the color or the image density of a flesh-color, green, or sky-blue area may be carried out even further.

Information representing the thus obtained tristimulus values R", G", and B" (i.e., the image signal S") is fed into the reproducing means 4. In the reproducing means 4, the image represented by the image signal S" is reproduced as a hard copy or a soft copy.

As described above, in the first embodiment of the image processing apparatus in accordance with the present invention, the physiological primary colors L0, M0, and S0, which have been calculated with Formula (8) shown above, are regarded as the white point of the photographing illuminant, under which the image signal S was acquired, and the physiological primary colors L, M, and S of each pixel are transformed with Formulas (10) and (11) shown above such that the physiological primary colors L0, M0, and S0 may coincide with the chromaticity values Ln, Mn, and Sn of the white of the reference photographing illuminant. Therefore, the image reproduced from the ultimately obtained image signal S" can be obtained such that it may have approximately the same impression of the color appearances as the impression of the image photographed under the reference photographing illuminant. The appearances of the image vary for different photographing illuminants, under which the image signal S is acquired. For example, in cases where the image is photographed in a cloudy day or in the shade, the white in the image looks in white with a blue tint as a whole. However, by virtue of the chromatic adaptation, a person recognizes the white with a blue tint as the white. Therefore, with the embodiment of the image processing apparatus in accordance with the present invention, wherein the physiological primary colors L, M, and S of each pixel are transformed such that the physiological primary colors L0, M0, and S0 may coincide with the chromaticity values Ln, Mn, and Sn of the white point of the reference photographing illuminant, the white represented by the image signal S" is transformed into the same white as the white, which is represented by an image signal acquired under the reference photographing illuminant. As a result, the image can be reproduced from the image signal S" such that the image may have the same impression of the image appearances as the impression given by the image when the image signal S was acquired.

Also, as the distance between (u0, v0) and (un, vn) becomes large, the value of "a" in Formula (11) shown above is adjusted to be small in accordance with Formulas (12) and (13) shown above. Therefore, the tint of the photographing illuminant can remain. As a result, the image true to the appearances of the original scene can be reproduced.

Figure 3:
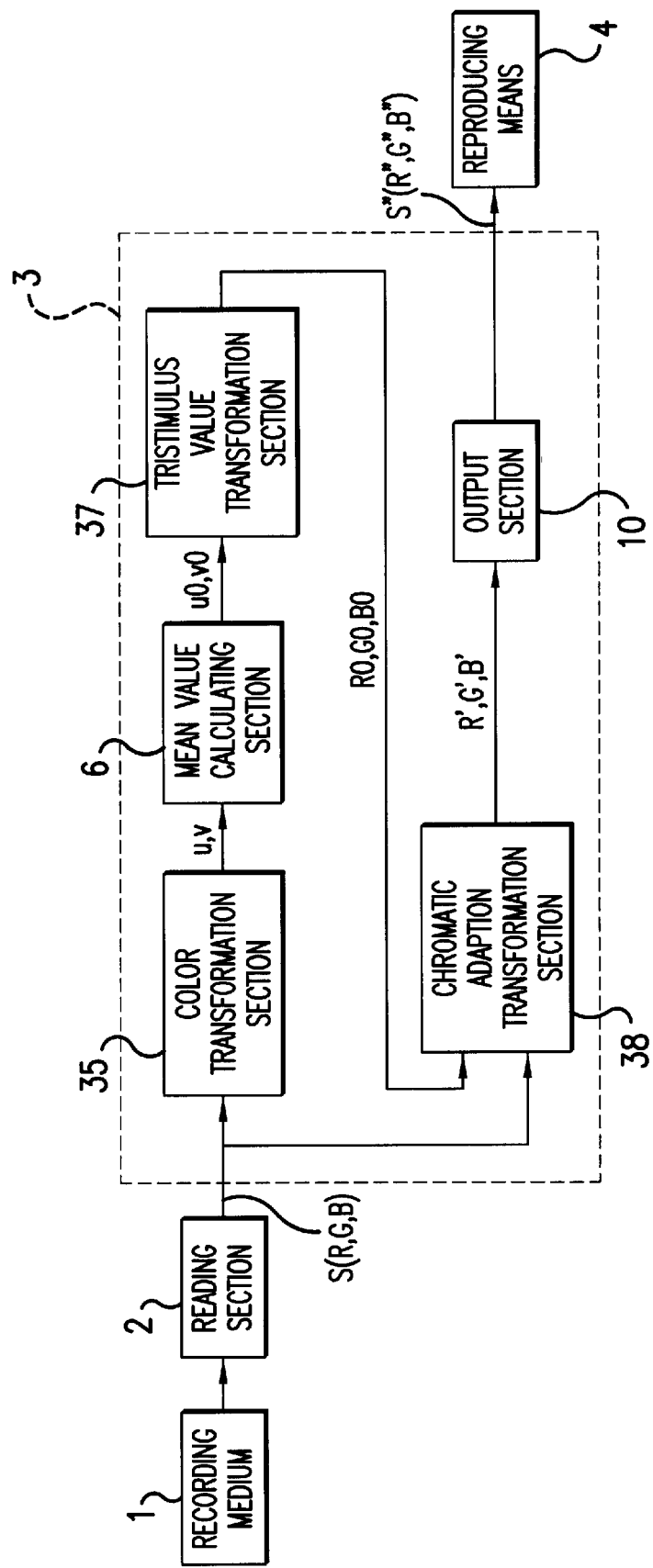
FIG. 3 is a block diagram showing an image processing system, in which a second embodiment of the image processing apparatus in accordance with the present invention is employed.

A second embodiment of the image processing apparatus in accordance with the present invention will be described hereinbelow. FIG. 3 is a block diagram showing an image processing system, in which the second embodiment of the image processing apparatus in accordance with the present invention is employed. In FIG. 3, similar elements are numbered with the same reference numerals with respect to FIG. 1. In the second embodiment, a color transformation section 35, a tristimulus value transformation section 37, and a chromatic adaptation transformation section 38 are provided in lieu of the color transformation section 5, the physiological primary color transformation section 7, the chromatic adaptation transformation section 8, and the RGB transformation section 9, which are provided in the first embodiment described above. The color transformation section 35 transforms the tristimulus values R, G, and B into CIE 1976 uv chromaticity values. The tristimulus value transformation section 37 transforms the mean values u0 and v0, which have been calculated by the mean value calculating section 6, into tristimulus values R0, G0, and B0 instead of the physiological primary colors L0, M0, and S0. The chromatic adaptation transformation section 38 carries out chromatic adaptation transformation on the tristimulus values R, G, and B and in accordance with the tristimulus values R0, G0, and B0, which have been calculated by the tristimulus value transformation section 37.

How the second embodiment of the image processing apparatus in accordance with the present invention operates will be described hereinbelow.

Firstly, the reading section 2 reads the image signal S from the recording medium 1 and feeds it into the image processing means 3. In the image processing means 3, the color transformation section 35 transforms the tristimulus values R, G, and B of each of the pixels in the image, which is reproduced from the image signal S, into the CIE 1976 uv chromaticity values. The transformation is carried out with Formulas (1) and (2) shown above.

In the mean value calculating section 6, the mean values u0 and v0 of the chromaticity values u and v, which have been calculated with Formula (2) shown above with respect to the pixels in the image, are calculated with Formula (5) shown above.

In the tristimulus value transformation section 37, the mean values u0 and v0, which have been calculated by the mean value calculating section 6, are transformed into the tristimulus values R0, G0, and B0 with Formulas (6) and (7) shown above and Formula (15) shown below.

$$\begin{matrix} R0 \\ G0 \\ B0 \end{matrix} = |A|^{-1} \cdot \begin{matrix} X0 \\ Y0 \\ Z0 \end{matrix} \qquad (15)$$

In Formula (15), the matrix $|A|^{-1}$ is the inverse matrix of the matrix A in Formula (3) shown above.

In the chromatic adaptation transformation section 38, the tristimulus values R, G, and B, which have been inputted into the image processing means 3, are subjected to the chromatic adaptation transformation, which is carried out with Formulas (16) and (17) shown below. In this manner, transformed tristimulus values R', G', and B' are obtained.

$$\begin{matrix} R' \\ G' \\ B' \end{matrix} = |D| \cdot \begin{matrix} R \\ G \\ B \end{matrix} \qquad (16)$$

in which $$|D| = \begin{matrix} (a \cdot Rn + (1-a) \cdot R0)/R0 \\ (a \cdot Gn + (1-a) \cdot G0)/G0 \\ (a \cdot Bn + (1-a) \cdot B0)/B0 \end{matrix} \qquad (17)$$

In Formula (17), R0, G0, and B0 represent the tristimulus values of the mean values of the chromaticity values and have been calculated with Formula (15) shown above. The tristimulus values R0, G0, and B0 may be regarded as the white of the photographing illuminant, under which the image signal S was acquired. Also, Rn, Gn, and Bn represent the chromaticity of the white of the reference photographing illuminant, which serves as reference at the time of acquisition of the image signal S. In cases where the values of Rn, Gn, and Bn are unknown, the chromaticity (un, vn) of the white point corresponding to D50~D60 daylight may be employed. In Formula (17), "a" represents the value representing the state of adaptation and is normally 1. As in the first embodiment described above, the value of "a" maybe altered in accordance with Formulas (12) and (13) shown above by considering the distance between (u0, v0) and (un, vn) on the chromaticity diagram shown in FIG. 2. Alternatively, the value of "a" may be altered in accordance with the values of (u0, v0).

In the output section 10, the transformed tristimulus values R', G', and B' are transformed into tristimulus values R", G", and B", which depend upon the reproducing means 4, by use of a matrix or a look-up table.

Information representing the thus obtained tristimulus values R", G", and B" (i.e., the image signal S") is fed into the reproducing means 4. In the reproducing means 4, the image represented by the image signal S" is reproduced as a hard copy or a soft copy.

As described above, in the second embodiment of the image processing apparatus in accordance with the present invention, the tristimulus values R0, G0, and B0, which have been calculated with Formula (15) shown above, are regarded as the white point of the photographing illuminant, under which the image signal S was acquired, and the tristimulus values R, G, and B of each pixel are transformed with Formulas (16) and (17) shown above such that the tristimulus values R0, G0, and B0 may coincide with the chromaticity values Rn, Gn, and Bn of the white of the reference photographing illuminant. Therefore, as in the first embodiment described above, the image reproduced from the ultimately obtained image signal S" can be obtained such that it may have approximately the same impression of the color appearances as the impression of the image photographed under the reference photographing illuminant. Also, with the second embodiment, it is not necessary to transform the tristimulus values R, G, and B of each pixel into the physiological primary colors L, M, and S and to transform the physiological primary colors L', M', and S' into the tristimulus values R', G', and B' as in the first embodiment described above. Therefore, the time required to carry out the operations can be kept shorter than in the first embodiment. Further, since it is not necessary for the RGB transformation section 9 in the first embodiment to be provided, the constitution of the image processing apparatus can be kept simple.

When a comparison is made between the cases wherein the chromatic adaptation transformation is carried out in the space of the physiological primary colors LMS as in the first embodiment and the cases wherein the chromatic adaptation transformation is carried out in the space of the tristimulus values RGB as in the second embodiment, differences between the two cases appear in chromatic colors. Specifically, the white points coincide with each other between the cases of the physiological primary colors LMS and the cases of the tristimulus values RGB. However, as for the chromatic colors, a difference occurs in accordance with the saturation of the color and the distance between the white point of the photographing illuminant and the white point of the reference photographing illuminant. In the physiological primary color space, in which the perception of the visual cells of the human eyes is considered, the chromatic adaptation transformation can be carried out such that the appearances close to the actual impression may be obtained. However, as for an image containing little high saturation color, as in an image of nature, little difference occurs between the cases of the physiological primary color space and the cases of the tristimulus value space, and therefore no problem will occur visually.

In the first and second embodiments described above, the mean values (u0, v0) of the chromaticity values are calculated with Formula (5). Alternatively, since the major object pattern is recorded at the center portion of the image, the center portion of the image may be selected, and the mean values (u0, v0) may be calculated with respect to the center portion of the image. As another alternative, the mean values (u0, v0) may be calculated by assigning heavy weighting to the center portion of the image. In this manner, the degree of weighting may be altered in accordance with the positions in the image. It is also possible to carry out the weighting in the manner described below in accordance with the tint of each pixel.

Figure 4:
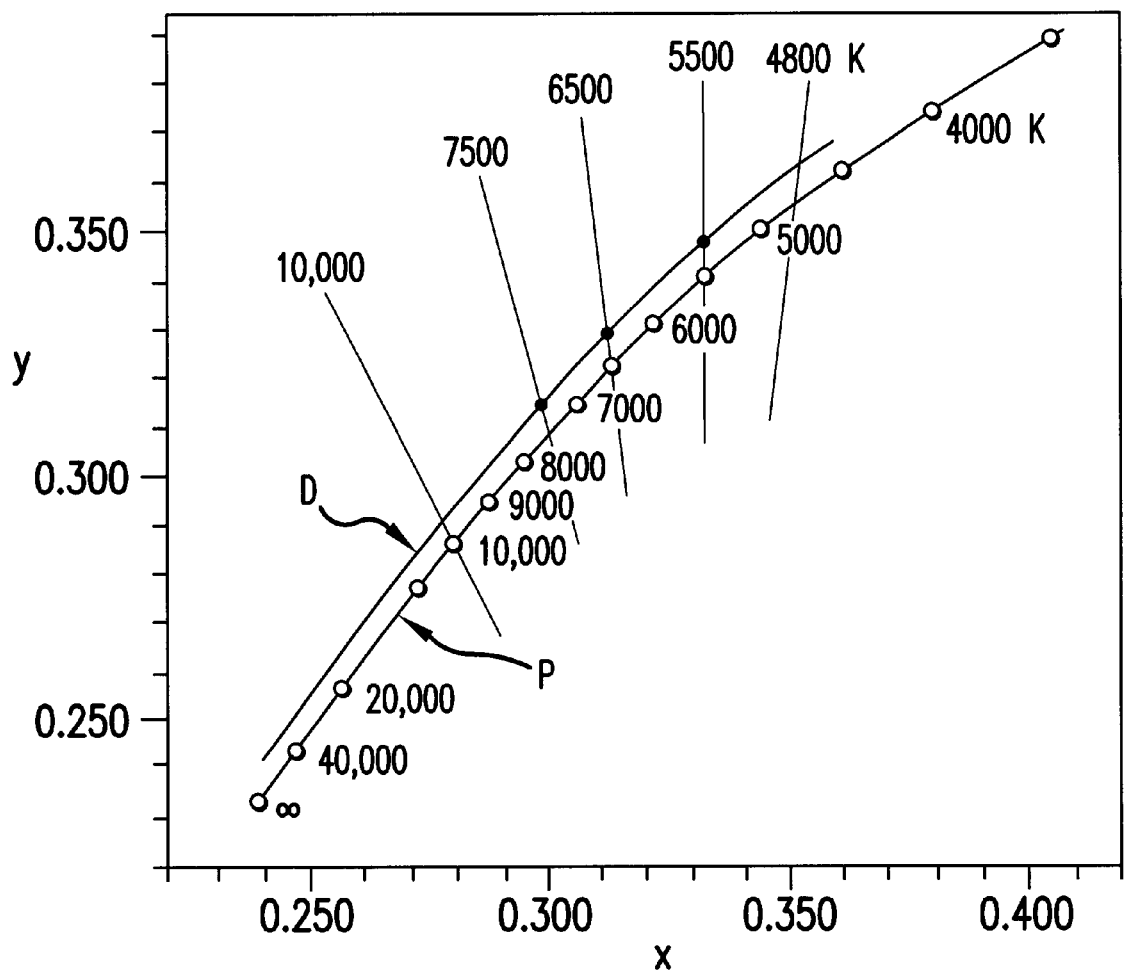
FIG. 4 is a graph showing a daylight locus and a Planckian locus.

Specifically, in the white balance adjustment for the photographing illuminant, for example, in cases where a green area is embedded in the image, it is difficult to discriminate whether the green area represents the green of a tree (i.e., an actually existing object) or is a white area, which looks in green due to a fluorescent lamp serving as the photographing illuminant. Also, it is difficult to discriminate whether a blue area embedded in the image represents the object color of the blue sky or is the area looking in blue due to the photographing in the shade. Further, it is difficult to discriminate whether a red area embedded in the image represents the object color of red clothes, or the like, or is the area looking in red due to the photographing under tungsten light. Ordinarily, it is considered that the chromaticity values of the photographing illuminant are located on the CIE daylight locus, the Planckian locus, or the black body locus shown in FIG. 4, and that an object color is located at a point spaced apart from the daylight locus (or the Planckian locus or the black body locus). Therefore, with respect to chromaticity values of a certain pixel, the distance between the chromaticity values and the daylight locus (or the Planckian locus or the black body locus) may be considered, and the mean values (u0, v0) may be calculated by weighting with the reciprocal of the distance. In cases where the mean values (u0, v0) are calculated in this manner, the degree of weighting with respect to a point spaced apart from the daylight locus, i.e. a pixel having chromaticity values considered to have a high possibility of representing an object color, can be set to be low. In this manner, the mean values (u0, v0) can be obtained as the values strongly reflecting the tint of the photographing illuminant. Specifically, in cases where the CIE daylight locus may be represented by two straight lines, the distance "d" between a certain pixel and the daylight locus may be calculated with Formula (18) shown below.

When $u \geq 0.2153$:

$$d=abs(v-0.6895 \times u-0.3478)/1.2147$$

When $u<0.2153$:

$$d=abs(v-1.6673 \times u-0.1372)/1.9442 \quad (18)$$

The weight "w" with respect to each pixel may be represented by Formula (19) shown below.

$$w=1.0-k' \times d \quad (19)$$

From Formulas (18) and (19) shown above, the weighted mean values (u0, v0) can be calculated with Formula (20) shown below.

$$u0=(\Sigma u \cdot w)/(\Sigma w)$$

$$v0=(\Sigma v \cdot w)/(\Sigma w) \quad (20)$$

In cases where effects of the blue sky are to be avoided, the weight may be set at 0 when $u<0.193$. Also, in cases where effects of bright red are to be avoided, the weight may be set at 0 when $u>0.235$. In this manner, the weight may be altered in accordance with the value of "u", and the mean values (u0, v0) may thereby be calculated.

Figure 5:
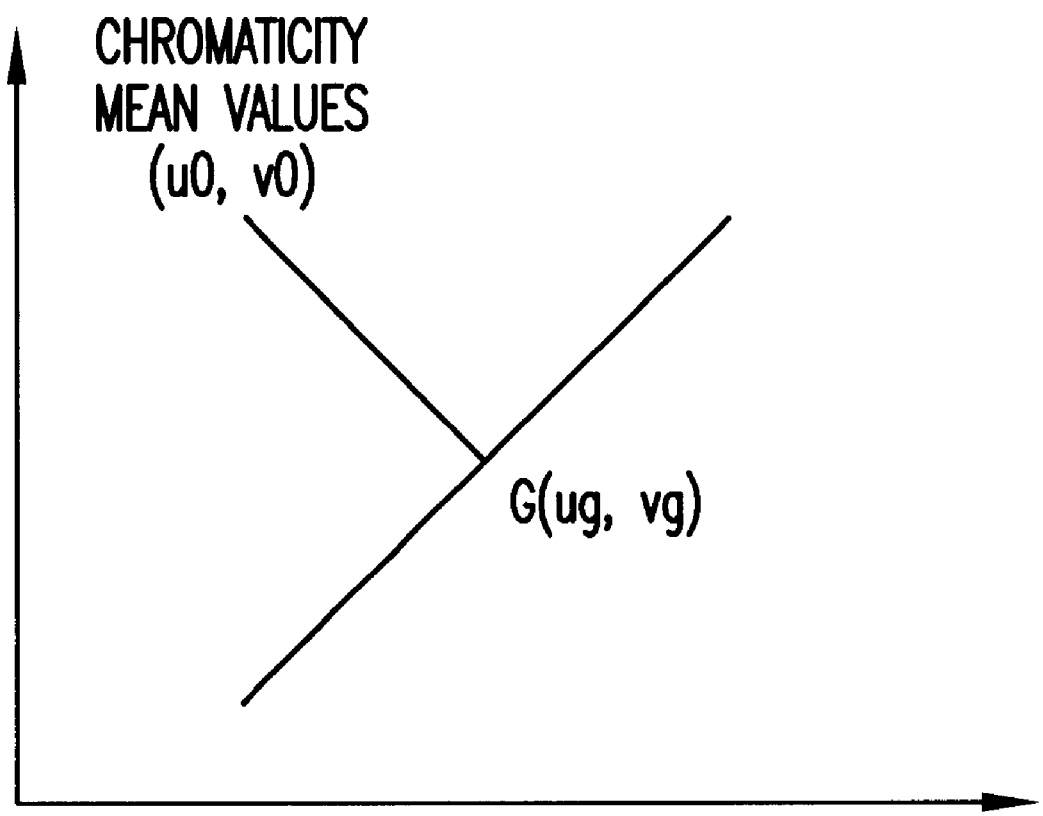
FIG. 5 is an explanatory graph showing how a point of intersection of a perpendicular, which is drawn from chromaticity mean values to a daylight locus, and the daylight locus is calculated.

Also, in the first and second embodiments described above, as the chromaticity values of the white of the reference photographing illuminant, which is to serve as reference at the time of acquisition of the image signal S, the values of a single white point are utilized. Alternatively, the white point of the reference photographing illuminant may be set in accordance with the white point of the photographing illuminant such that the white point of the reference photographing illuminant may have values falling within a certain range. As the certain range, a specific range on the daylight locus shown in FIG. 4 may be set. Specifically, in cases where the daylight locus may be represented by two straight lines, as illustrated in FIG. 5, a perpendicular may be drawn from the chromaticity mean values (u0, v0) to the daylight locus, and a point of intersection G(ug, vg) of the perpendicular and the daylight locus may be calculated with Formula (21) shown below.

$u0 \geq 0.2153$ $ug=(0.6895 \times v0+u0-0.6895 \times 0.3478)/(0.6895 \times 0.6895+1.0)$ $vg=(0.6895 \times 0.6895 \times v0+0.6895 \times u0+0.3478)/(0.6895 \times 0.6895+1.0)$ $u0<0.2153$ $ug=(1.6673 \times v0+u0-1.6673 \times 0.1372)/(1.6673 \times 1.6673+1.0)$ $vg=(1.6673 \times 1.6673 \times v0+1.6673 \times u0+0.1372)/(1.6673 \times 1.6673+1.0) \quad (21)$ Also, the white of the reference photographing illuminant may be determined in accordance with "ug." Specifically, when ug>0.2028, chromaticity values (0.2028, 0.4781) of a color temperature 5700 K on the daylight locus may be taken as the white point of the reference photographing illuminant and may be transformed into the chromaticity values Ln, Mn, and Sn or the tristimulus values Rn, Gn, and Bn.

When ug<0.2007, chromaticity values (0.2007, 0.4743) of a color temperature 6000 K on the daylight locus may be taken as the white point of the reference photographing illuminant and may be transformed into the chromaticity values Ln, Mn, and Sn or the tristimulus values Rn, Gn, and Bn.

When $0.2007 \leq ug \leq 0.2028$, G(ug, uv) may be taken as the white point of the reference photographing illuminant and may be transformed into the chromaticity values Ln, Mn, and Sn or the tristimulus values Rn, Gn, and Bn.

Figure 6A:
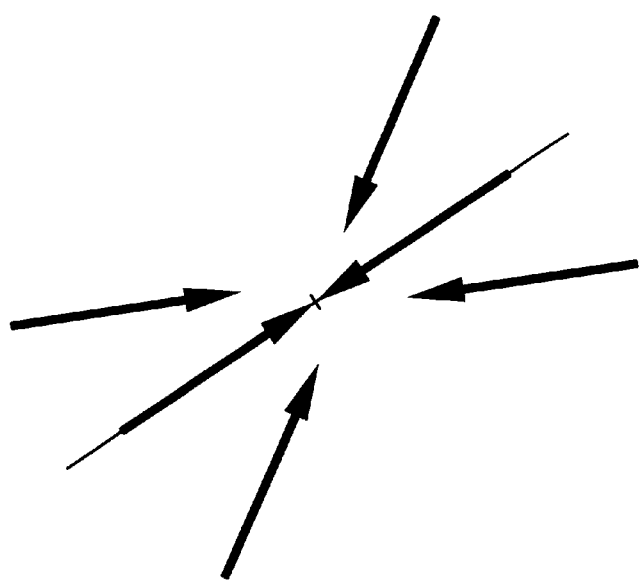
FIG. 6A is an explanatory view showing how chromatic adaptation transformation is carried out in cases where a white point of a reference photographing illuminant is set to be only one point.
Figure 6B:
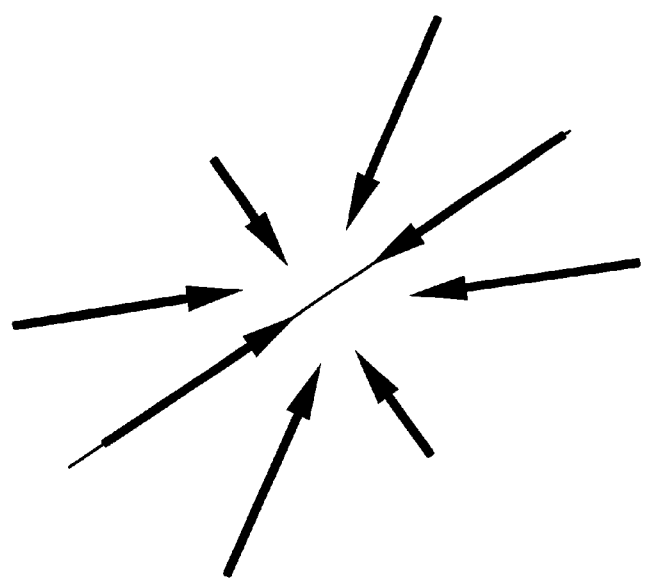
FIG. 6B is an explanatory view showing how chromatic adaptation transformation is carried out in cases where a white point of a reference photographing illuminant is set so as to have values falling within a predetermined range.

In cases where the white point of the reference photographing illuminant is set as a single point, the physiological primary colors L, M, and S or the tristimulus values R, G, and B are transformed with the chromatic adaptation transformation as shown in FIG. 6A. In cases where the white point of the reference photographing illuminant is set so as to have values falling within a certain range, the physiological primary colors L, M, and S or the tristimulus values R, G, and B are transformed with the chromatic adaptation transformation as shown in FIG. 6B. Therefore, in the latter case, the physiological primary colors L, M, and S or the tristimulus values R, G, and B can be prevented from being corrected excessively with the chromatic adaptation transformation, and therefore an image having a natural feeling can be reproduced. Also, since the white point of the reference photographing illuminant is obtained in accordance with the white point of the photographing illuminant, the chromatic adaptation transformation can be carried out such that the color of the photographing illuminant may be reflected.

In the embodiments of the image processing apparatus described above, the image processing method and apparatus in accordance with the present invention are constituted as hardware functions. Alternatively, a program for causing a computer to execute the image processing method in accordance with the present invention may be recorded on a recording medium and may be furnished in this form.

An embodiment of the image reproducing system in accordance with the present invention will be described hereinbelow.

Figure 7:
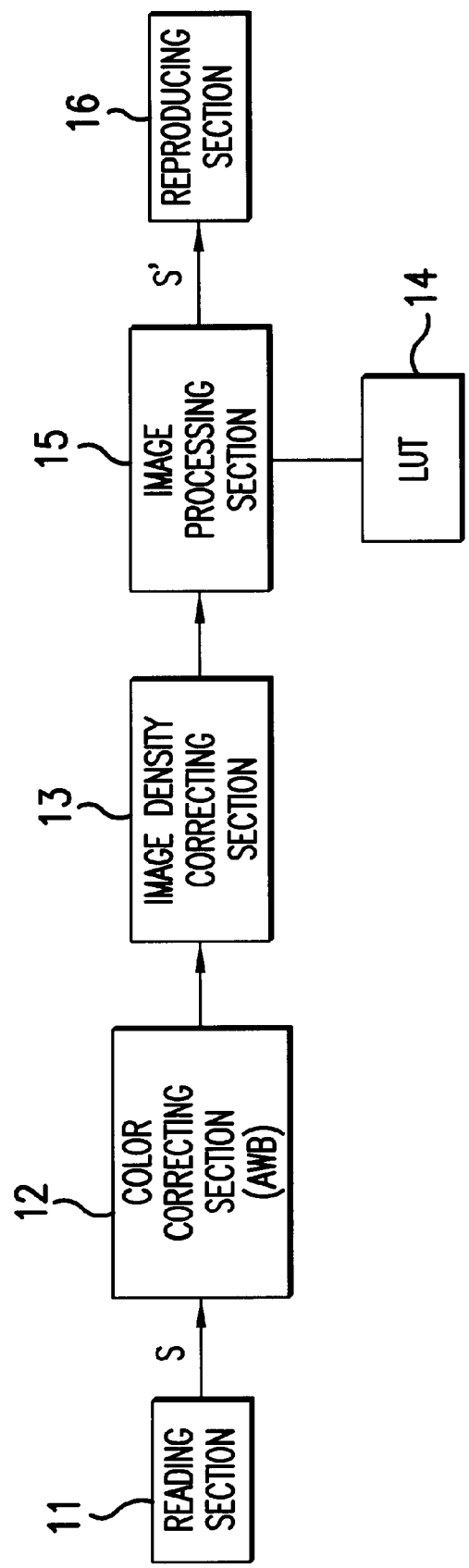
FIG. 7 is a block diagram showing an embodiment of the image reproducing system in accordance with the present invention.

FIG. 7 is a block diagram showing the embodiment of the image reproducing system in accordance with the present invention, in which the image processing apparatus in accordance with the present invention is employed. As illustrated in FIG. 7, the image reproducing system, in which the image processing apparatus in accordance with the present invention is employed, comprises a reading section 11 for reading the image signal S from a recording medium, on which the image signal S having been acquired with a digital camera, or the like, has been recorded. The image reproducing system also comprises a color correcting section (AWB) 12, in which the image processing apparatus in accordance with the present invention is incorporated, and an image density correcting section 13 for correcting the image density represented by the image signal S having been subjected to color correction. The image reproducing system further comprises an image processing section 15 for carrying out image processing, such as gradation processing, on the image signal S, which has been obtained from the image density correction, by making reference to a look-up table (LUT) 14. The image reproducing system still further comprises a reproducing section 16 for reproducing a visible image from an image signal S', which has been obtained from the image processing. This embodiment of the image reproducing system may take on the form of a printer or a CRT monitor.

How this embodiment of the image reproducing system in accordance with the present invention operates will be described hereinbelow.

The image signal S, which has been read by the reading section 11, is fed into the color correcting section 12. In the color correcting section 12, the image processing is carried out on the image signal S in the same manner as that in the embodiments of the image processing apparatus described above. In the image density correcting section 13, the image signal S is then subjected to image density correction. the image signal S having been obtained from the image density correction is fed into the image processing section 15. In the image processing section 15, the image processing, such as gradation conversion, is carried out on the image signal, which has been obtained from the image density correction, by making reference to the LUT 14. In the reproducing section 16, a visible image is reproduced as a hard copy or a soft copy from the image signal S', which has been obtained from the image processing.

As described above, with this embodiment of the image reproducing system, which is provided with the aforesaid image processing apparatus in accordance with the present invention, the inputted image signal S is transformed such that the impression of the image appearances at the time of the photographing operation may be reproduced. The image signal having thus been transformed is then used to reproduce a visible image. Therefore, an image true to the appearances at the time of the photographing operation can be reproduced by merely inputting the image signal S.

An embodiment of the image sensing system in accordance with the present invention will be described hereinbelow.

Figure 8:
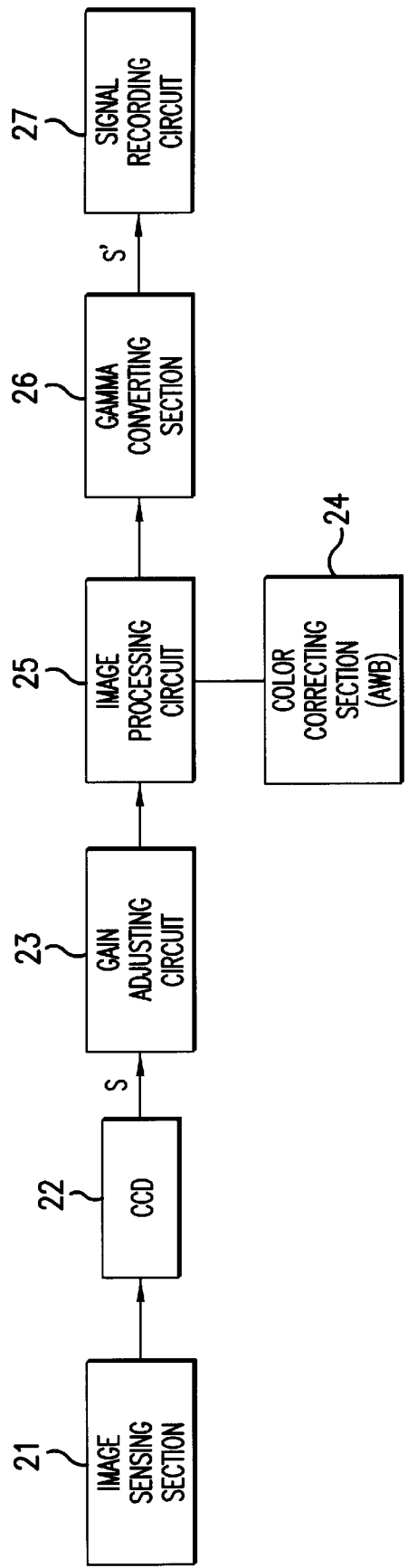
FIG. 8 is a block diagram showing an embodiment of the image sensing system in accordance with the present invention.

FIG. 8 is a block diagram showing an embodiment of the image sensing system in accordance with the present invention, in which the image processing apparatus in accordance with the present invention is employed and which takes on the form of a digital camera. As illustrated in FIG. 8, the embodiment of the digital camera comprises an image sensing section 21, which is constituted of lenses, a stop, and the like. The digital camera also comprises a charge coupled device (CCD) image sensor 22 for photoelectrically converting the obtained object image and thereby obtaining the image signal S, which represents the object image. The digital camera further comprises a gain adjusting circuit 23 for adjusting the gain of the image signal S, and a color correcting section (AWB) 24, in which the image processing apparatus in accordance with the present invention is incorporated. The digital camera still further comprises an image processing circuit 25 for carrying out image processing, including the processing with the color correcting section 24, on the image signal S. The digital camera also comprises a gamma converting section 26 for carrying out gamma conversion on the image signal, which has been obtained from the processing carried out by the image processing circuit 25. The digital camera further comprises a signal recording circuit 27 for recording the image signal S', which has been obtained from the gamma conversion, on a recording medium, or the like.

How the embodiment of the image sensing system operates will be described hereinbelow.

The object image, which has been obtained by the image sensing section 21, is photoelectrically converted by the CCD image sensor 22 into the image signal S. The image signal S is then subjected to the gain adjustment in the gain adjusting circuit 23. Thereafter, in the color correcting section 24 and the image processing circuit 25, the image processing is carried out on the image signal S in the manner described above. The image signal, which has been obtained from the image processing, is subjected to the gamma conversion in the gamma converting section 26. The image signal S', which has been obtained from the gamma conversion, is fed into the signal recording circuit 27 and recorded on the recording medium.

As described above, with this embodiment of the image sensing system, which is provided with the aforesaid image processing apparatus in accordance with the present invention, the image signal S having been acquired with the image sensing operation is recorded on the recording medium as the processed image signal S', from which the impression of the image appearances at the time of the image sensing operation may be reproduced. Therefore, the image signal can be obtained, from which an image true to the impression of the appearances at the time of the image sensing operation can be reproduced, by merely carrying out the image sensing operation for the object.

What is claimed is:

1. An image processing method, comprising the steps of:
   i) transforming R, G, and B colors of each of pixels in an image, which is represented by an image signal having been acquired with an image sensing operation, into chromaticity values,
   ii) calculating chromaticity mean values, which are mean values of the chromaticity values having been obtained with respect to the pixels in the image,
   iii) transforming said chromaticity mean values into tristimulus values in accordance with physiological primary colors, and
   iv) regarding said tristimulus values in accordance with physiological primary colors as the white of a photographing illuminant, under which said image signal was acquired, and transforming said image signal such that said tristimulus values may coincide with chromaticity values of a white point of a reference photographing illuminant, a processed image signal being thereby obtained.

2. An image processing method as defined in claim 1 wherein, as the differences between said tristimulus values in accordance with physiological primary colors and said chromaticity values of the white point of said reference photographing illuminant become large, the degree of said coincidence is kept to be low.

3. An image processing method as defined in claim 1 or 2 wherein said chromaticity mean values are calculated as weighted mean values in accordance with a reciprocal of a distance of said chromaticity values from a CIE daylight locus or a black body locus.

4. An image processing method as defined in claim 1 or 2 wherein the white point of said reference photographing illuminant is set in accordance with the white point of said photographing illuminant such that the white point of said reference photographing illuminant may have values falling within a predetermined range.

5. An image processing method as defined in claim 1 or 2 wherein said processed image signal is transformed even further in accordance with reproduction target values of a reproducing apparatus, which reproduces a visible image from said processed image signal.

6. An image processing method, comprising the steps of:
   i) transforming R, G, and B colors of each of pixels in an image, which is represented by an image signal having been acquired with an image sensing operation, into chromaticity values,
   ii) calculating chromaticity mean values, which are mean values of the chromaticity values having been obtained with respect to the pixels in the image,
   iii) transforming said chromaticity mean values into RGB tristimulus values, and
   iv) regarding said RGB tristimulus values as the white of a photographing illuminant, under which said image signal was acquired, and transforming said image signal such that said RGB tristimulus values may coincide with chromaticity values of a white point of a reference photographing illuminant, a processed image signal being thereby obtained.

7. An image processing method as defined in claim 6 wherein, as the differences between said RGB tristimulus values and said chromaticity values of the white point of said reference photographing illuminant become large, the degree of said coincidence is kept to be low.

8. An image processing method as defined in claim 6 or 7 wherein said chromaticity mean values are calculated as weighted mean values in accordance with a reciprocal of a distance of said chromaticity values from a CIE daylight locus or a black body locus.

9. An image processing method as defined in claim 4 or 5 wherein the white point of said reference photographing illuminant is set in accordance with the white point of said photographing illuminant such that the white point of said reference photographing illuminant may have values falling within a predetermined range.

10. An image processing method as defined in claim 6 or 7 wherein said processed image signal is transformed even further in accordance with reproduction target values of a reproducing apparatus, which reproduces a visible image from said processed image signal.

11. An image processing apparatus, comprising:
    i) a chromaticity value transformation means for transforming R, G, and B colors of each of pixels in an image, which is represented by an image signal having been acquired with an image sensing operation, into chromaticity values,
    ii) a chromaticity mean value calculating means for calculating chromaticity mean values, which are mean values of the chromaticity values having been obtained with respect to the pixels in the image,
    iii) a tristimulus value transformation means for transforming said chromaticity mean values into tristimulus values in accordance with physiological primary colors, and
    iv) a chromatic adaptation transformation means for regarding said tristimulus values in accordance with physiological primary colors as the white of a photographing illuminant, under which said image signal was acquired, and transforming said image signal such that said tristimulus values may coincide with chromaticity values of a white point of a reference photographing illuminant, a processed image signal being thereby obtained.

12. An image processing apparatus as defined in claim 11 wherein said chromatic adaptation transformation means operates such that, as the differences between said tristimulus values in accordance with physiological primary colors and said chromaticity values of the white point of said reference photographing illuminant become large, the degree of said coincidence may be kept to be low.

13. An image processing apparatus as defined in claim 11 or 12 wherein said chromaticity mean value calculating means calculates said chromaticity mean values as weighted mean values in accordance with a reciprocal of a distance of said chromaticity values from a CIE daylight locus or a black body locus.

14. An image processing apparatus as defined in claim 11 or 12 further comprising means for setting the white point of said reference photographing illuminant in accordance with the white point of said photographing illuminant such that the white point of said reference photographing illuminant may have values falling within a predetermined range.

15. An image processing apparatus as defined in claim 11 or 12 further comprising an output transformation means for transforming said processed image signal in accordance with reproduction target values of a reproducing apparatus, which reproduces a visible image from said processed image signal.

16. An image processing apparatus, comprising:
    i) a chromaticity value transformation means for transforming R, G, and B colors of each of pixels in an image, which is represented by an image signal having been acquired with an image sensing operation, into chromaticity values,
    ii) a chromaticity mean value calculating means for calculating chromaticity mean values, which are mean values of the chromaticity values having been obtained with respect to the pixels in the image,
    iii) a tristimulus value transformation means for transforming said chromaticity mean values into RGB tristimulus values, and
    iv) a chromatic adaptation transformation means for regarding said RGB tristimulus values as the white of a photographing illuminant, under which said image signal was acquired, and transforming said image signal such that said RGB tristimulus values may coincide with chromaticity values of a white point of a reference photographing illuminant, a processed image signal being thereby obtained.

17. An image processing apparatus as defined in claim 16 wherein said chromatic adaptation transformation means operates such that, as the differences between said RGB tristimulus values and said chromaticity values of the white point of said reference photographing illuminant become large, the degree of said coincidence may be kept to be low.

18. An image processing apparatus as defined in claim 16 or 17 wherein said chromaticity mean value calculating means calculates said chromaticity mean values as weighted mean values in accordance with a reciprocal of a distance of said chromaticity values from a CIE daylight locus or a black body locus.

19. An image processing apparatus as defined in claim 16 or 17 further comprising means for setting the white point of said reference photographing illuminant in accordance with the white point of said photographing illuminant such that the white point of said reference photographing illuminant may have values falling within a predetermined range.

20. An image processing apparatus as defined in claim 16 or 17 further comprising an output transformation means for transforming said processed image signal in accordance with reproduction target values of a reproducing apparatus, which reproduces a visible image from said processed image signal.

21. A recording medium, on which a program has been recorded and from which a computer is capable of reading said program, said program causing the computer to execute:
   i) a procedure for transforming R, G, and B colors of each of pixels in an image, which is represented by an image signal having been acquired with an image sensing operation, into chromaticity values,
   ii) a procedure for calculating chromaticity mean values, which are mean values of the chromaticity values having been obtained with respect to the pixels in the image,
   iii) a procedure for transforming said chromaticity mean values into tristimulus values in accordance with physiological primary colors, and
   iv) a procedure for regarding said tristimulus values in accordance with physiological primary colors as the white of a photographing illuminant, under which said image signal was acquired, and transforming said image signal such that said tristimulus values may coincide with chromaticity values of a white point of a reference photographing illuminant, a processed image signal being thereby obtained.

22. A recording medium as defined in claim 21 wherein, in the procedure for obtaining said processed image signal, as the differences between said tristimulus values in accordance with physiological primary colors and said chromaticity values of the white point of said reference photographing illuminant become large, the degree of said coincidence is kept to be low.

23. A recording medium as defined in claim 21 or 22 wherein, in the procedure for calculating said chromaticity mean values, said chromaticity mean values are calculated as weighted mean values in accordance with a reciprocal of a distance of said chromaticity values from a CIE daylight locus or a black body locus.

24. A recording medium as defined in claim 21 or 22 wherein said program further comprises a procedure for setting the white point of said reference photographing illuminant in accordance with the white point of said photographing illuminant such that the white point of said reference photographing illuminant may have values falling within a predetermined range.

25. A recording medium as defined in claim 21 or 22 wherein said program further comprises a procedure for transforming said processed image signal in accordance with reproduction target values of a reproducing apparatus, which reproduces a visible image from said processed image signal.

26. A recording medium, on which a program has been recorded and from which a computer is capable of reading said program, said program causing the computer to execute:
   i) a procedure for transforming R, G, and B colors of each of pixels in an image, which is represented by an image signal having been acquired with an image sensing operation, into chromaticity values,
   ii) a procedure for calculating chromaticity mean values, which are mean values of the chromaticity values having been obtained with respect to the pixels in the image,
   iii) a procedure for transforming said chromaticity mean values into RGB tristimulus values, and
   iv) a procedure for regarding said RGB tristimulus values as the white of a photographing illuminant, under which said image signal was acquired, and transforming said image signal such that said RGB tristimulus values may coincide with chromaticity values of a white point of a reference photographing illuminant, a processed image signal being thereby obtained.

27. A recording medium as defined in claim 26 wherein, in the procedure for obtaining said processed image signal, as the differences between said RGB tristimulus values and said chromaticity values of the white point of said reference photographing illuminant become large, the degree of said coincidence is kept to be low.

28. A recording medium as defined in claim 26 or 27 wherein, in the procedure for calculating said chromaticity mean values, said chromaticity mean values are calculated as weighted mean values in accordance with a reciprocal of a distance of said chromaticity values from a CIE daylight locus or a black body locus.

29. A recording medium as defined in claim 26 or 27 wherein said program further comprises a procedure for setting the white point of said reference photographing illuminant in accordance with the white point of said photographing illuminant such that the white point of said reference photographing illuminant may have values falling within a predetermined range.

30. A recording medium as defined in claim 26 or 27 wherein said program further comprises a procedure for transforming said processed image signal in accordance with reproduction target values of a reproducing apparatus, which reproduces a visible image from said processed image signal.

31. An image sensing system, comprising:
   i) an image sensing means for detecting an object image with an image sensing operation and thereby obtaining an image signal, which represents the object image,
   ii) an image processing apparatus comprising:
      a) a chromaticity value transformation means for transforming R, G, and B colors of each of pixels in an image, which is represented by an image signal having been acquired with an image sensing operation, into chromaticity values,
      b) a chromaticity mean value calculating means for calculating chromaticity mean values, which are mean values of the chromaticity values having been obtained with respect to the pixels in the image,
      c) a tristimulus value transformation means for transforming said chromaticity mean values into tristimulus values in accordance with physiological primary colors, and
      d) a chromatic adaptation transformation means for regarding said tristimulus values in accordance with physiological primary colors as the white of a photographing illuminant, under which said image signal was acquired, and transforming said image signal such that said tristimulus values may coincide with chromaticity values of a white point of a reference photographing illuminant, a processed image signal being thereby obtained, wherein the image processing apparatus carries out image processing on the image signal and thereby obtains a processed image signal, and iii) a recording means for recording said processed image signal, which has been obtained from the image processing carried out by said image processing apparatus, on a recording medium.

32. An image sensing system, comprising:

i) an image sensing means for detecting an object image with an image sensing operation and thereby obtaining an image signal, which represents the object image, ii) an image processing apparatus comprising:

a) a chromaticity value transformation means for transforming R, G, and B colors of each of pixels in an image, which is represented by an image signal having been acquired with an image sensing operation, into chromaticity values, b) a chromaticity mean value calculating means for calculating chromaticity mean values, which are mean values of the chromaticity values having been obtained with respect to the pixels in the image, c) a tristimulus value transformation means for transforming said chromaticity mean values into RGB tristimulus values, and d) a chromatic adaptation transformation means for regarding said RGB tristimulus values as the white of a photographing illuminant, under which said image signal was acquired, and transforming said image signal such that said RGB tristimulus values may coincide with chromaticity values of a white point of a reference photographing illuminant, a processed image signal being thereby obtained, wherein the image processing apparatus carries out image processing on the image signal and thereby obtains a processed image signal, and iii) a recording means for recording said processed image signal, which has been obtained from the image processing carried out by said image processing apparatus, on a recording medium.

33. An image reproducing system for reproducing a visible image from an image signal, comprising:

i) an input means for receiving the image signal, ii) an image processing apparatus comprising:

a) a chromaticity value transformation means for transforming R, G, and B colors of each of pixels in an image, which is represented by an image signal having been acquired with an image sensing operation, into chromaticity values, b) a chromaticity mean value calculating means for calculating chromaticity mean values, which are mean values of the chromaticity values having been obtained with respect to the pixels in the image, c) a tristimulus value transformation means for transforming said chromaticity mean values into tristimulus values in accordance with physiological primary colors, and d) a chromatic adaptation transformation means for regarding said tristimulus values in accordance with physiological primary colors as the white of a photographing illuminant, under which said image signal was acquired, and transforming said image signal such that said tristimulus values may coincide with chromaticity values of a white point of a reference photographing illuminant, a processed image signal being thereby obtained, wherein the image processing apparatus carries out image processing on the image signal having been received from said input means and thereby obtains a processed image signal, and iii) a reproducing means for reproducing the visible image from said processed image signal, which has been obtained from the image processing carried out by said image processing apparatus.

34. An image reproducing system for reproducing a visible image from an image signal, comprising:

i) an input means for receiving the image signal, ii) an image processing apparatus comprising:

a) a chromaticity value transformation means for transforming R, G, and B colors of each of pixels in an image, which is represented by an image signal having been acquired with an image sensing operation, into chromaticity values, b) a chromaticity mean value calculating means for calculating chromaticity mean values, which are mean values of the chromaticity values having been obtained with respect to the pixels in the image, c) a tristimulus value transformation means for transforming said chromaticity mean values into RGB tristimulus values, and d) a chromatic adaptation transformation means for regarding said RGB tristimulus values as the white of a photographing illuminant, under which said image signal was acquired, and transforming said image signal such that said RGB tristimulus values may coincide with chromaticity values of a white point of a reference photographing illuminant, a processed image signal being thereby obtained, wherein the image processing apparatus carries out image processing on the image signal having been received from said input means and thereby obtains a processed image signal, and iii) a reproducing means for reproducing the visible image from said processed image signal, which has been obtained from the image processing carried out by said image processing apparatus.

* * * * *